Patented Sept. 27, 1932

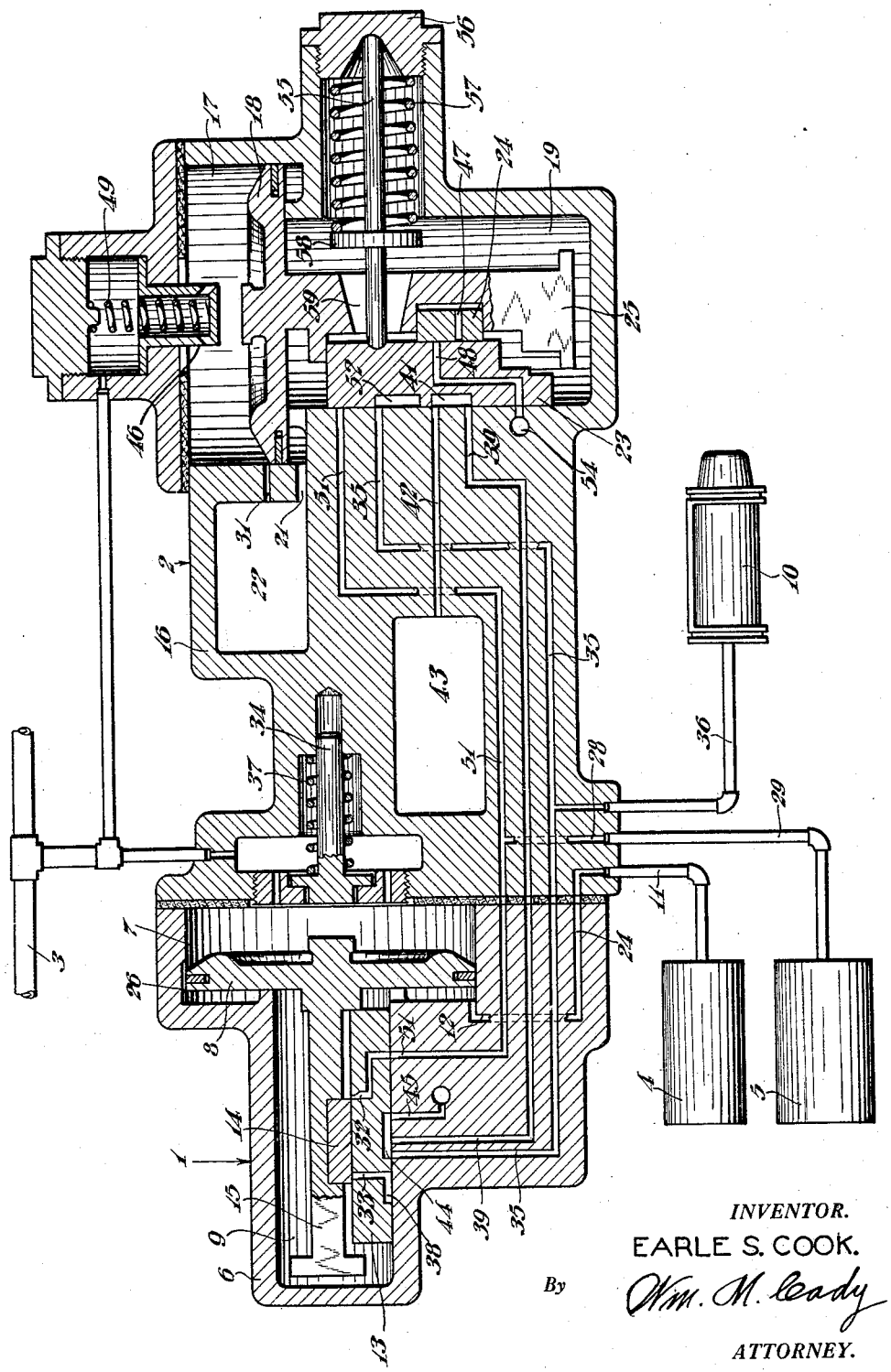

1,879,662

UNITED STATES PATENT OFFICE

EARLE S. COOK, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed October 23, 1931. Serial No. 570,530.

This invention relates to fluid pressure brakes and more particularly to a fluid pressure brake system in which the brakes are applied by effecting a reduction in brake pipe pressure.

In the fluid pressure brake system of a long train, with the brake valve device in the usual running position, there is a gradient in pressure in the brake pipe which extends from the front end of the train toward the rear, due to the fact that the supply of fluid under pressure to the brake pipe is only at the front end of the train, while leakage from the brake pipe takes place throughout the train.

Upon an application of the brakes incident to operating the brake valve on the locomotive, the pressure gradient is reversed and the pressure is diminished from the rear end of the brake pipe toward the front end thereof.

Since the rate of drop in brake pipe pressure is thus greater at the front end of the train than at the rear end, the brakes on cars at the front end of the train are applied with greater force than at the rear, with the result that the slack in the train is permitted to run in with such force as to cause excessive shocks.

An object of the invention is to provide a fluid pressure brake system having means for preventing an excessive build-up of brake cylinder pressure on cars at the head end of the train, when an application of the brakes is effected.

A further object of the invention is to provide a fluid pressure brake system wherein the improved operating condition referred to above is accomplished by simple and inexpensive modifications of the standard triple valve and the provision of a small volume reservoir into which fluid from the auxiliary reservoir is vented at the time of a service application of the brakes.

These and other objects that will be made apparent throughout the further description of my invention are attained in the apparatus hereinafter described and illustrated in the accompanying drawing, wherein the figure is a sectional view of a triple valve device and associated apparatus embodying my invention.

Referring to the drawing, the invention includes a triple valve device 1 and an associated emergency valve device 2, which constitute a valve unit, it being understood that a similar valve unit is associated with each brake cylinder 10, on each car of the train and is connected to the brake pipe 3 which extends the entire length of the train. The usual auxiliary reservoir 4 and emergency reservoir 5 are also associated with each triple valve device.

The triple valve device 1 comprises a casing 6 having a piston chamber 7 connected to the brake pipe 3 and containing a piston 8 and having a valve chamber 9 at the opposite side of the piston 8 connected by pipe 11 and passage 12 to the auxiliary reservoir 4. The valve chamber 9 contains a slide valve 13 and a graduating valve 14 adapted to be operated by piston 9, through stem 15 in the usual manner.

The emergency valve device comprises a casing 16 having a piston chamber 17 connected to the brake pipe 3 and containing a piston 18, and having a valve chamber 19 at the opposite side of the piston connected through passage 21 with the quick acting reservoir 22 and containing a main slide valve 23 and an auxiliary slide valve 24 adapted to be operated by piston 18 through stem 25.

In operation, when the brake pipe 3 is charged with fluid under pressure by operation of the brake valve device (not shown) on the locomotive, fluid under pressure is supplied to the piston chamber 7 of the triple valve device and flows thence through the usual feed groove 26 around the piston 8 to valve chamber 9 and from valve chamber 9 through passage 12 and pipe 11 to the auxiliary reservoir 4.

With the triple valve parts in normal release position, as shown, fluid under pressure is supplied to the emergency reservoir 5 through port 32 in main slide valve 13, passages 27 and 28 and pipe 29.

Fluid under pressure from the brake pipe 3 also flows to the emergency piston chamber 17 and thence through restricted port 31 to quick action reservoir 22, which is connected to valve chamber 19 through passage 21.

When it is desired to effect a service application of the brakes, a gradual reduction in the brake pipe pressure is effected by moving the usual brake valve device to service application position.

The reduction in brake pipe pressure causes the triple valve piston 8 to be shifted to the right by the auxiliary reservoir pressure in valve chamber 9, first moving the graduating valve 14 relative to the main valve 13, so as to lap the port 32 and uncover the service port 33. Further movement of the piston 8 causes the main valve 13 to be shifted until the service port 33 registers with passage 35, and in this position the piston 8 engages the graduating spring stop 34.

Fluid under pressure is now supplied from valve chamber 9 and the auxiliary reservoir 4 to the brake cylinder 10, through port 33, passage 35 and pipe 36.

Now, according to my invention, if the rate of drop in the brake pipe pressure should exceed the rate at which fluid under pressure is supplied from the auxiliary reservoir to the brake cylinder, as would be the case on cars at the head end of a long train, then the piston 9 will be shifted by the higher auxiliary reservoir pressure, so as to cause the graduating spring stop 34 to compress the spring 37. By the further movement of the piston, the main slide valve 13 is further shifted to the right, so that a foot extension 38 of the port 33 registers with passage 39, which leads, through cavity 41 in the emergency slide valve 23 and passage 42 to a volume reservoir 43.

In the release position of the main slide valve 13, passage 39 is connected through cavity 44 with the atmospheric exhaust port 45, so that said volume reservoir is normally at atmospheric pressure. Consequently, when the passage 39 is connected with the service port 33, by the over-travel of the slide valve 13, fluid under pressure is supplied from the auxiliary reservoir to the volume reservoir 43, as well as to the brake cylinder 10, thus reducing the effective pressure supplied to the brake cylinder 10.

When the rate of drop in the brake pipe pressure is less than the rate at which fluid flows from the auxiliary reservoir to the brake cylinder, as on cars at the rear of the train, the triple valve piston 8 only moves into engagement with the graduating spring stop 34. Consequently, fluid from the auxiliary reservoir is not discharged into the volume reservoirs but to the brake cylinders alone on cars in the rear end of the train.

The pressure of fluid supplied to the brake cylinders on cars at the rear of the train for a given reduction in brake pipe pressure is therefore greater than the pressure of fluid supplied to cars at the front end of the train.

After a service application of the brakes has occurred the pressure in the triple valve chamber 9 falls to the pressure in the auxiliary reservoir and brake cylinder and since this pressure is then less than the pressure in the brake pipe and piston chamber 7, the piston is moved to the left, thus causing the graduating valve 14 to first lap the service port 33, thus closing communication between the auxiliary reservoir and the brake cylinder and preventing the escape of fluid from the brake cylinder.

In the lap position of the triple valve the piston rests against the right end of the main valve 13 where it remains until the pressure in the brake pipe is increased, by movement of the brake valve to running position, sufficiently to overcome the pressure in the auxiliary reservoir and the frictional resistance of the main valve 13. When this occurs, the main valve 13 moves to its original running position shown wherein the brake cylinder and volume reservoir are open to the atmosphere and communication between the brake pipe and the auxiliary and emergency reservoirs is established.

Upon a service application of the brakes occasioned by movement of the brake valve device to service position, the brake pipe pressure is gradually reduced in the emergency piston chamber 17, causing the piston to move into engagement with the graduating spring stop 46 and to so move the auxiliary valve 24 that the port 47 registers with port 48 in the emergency slide valve 23, which in turn registers with atmospheric exhaust port 54.

The port 47 is of such restricted flow area that the pressure in chamber 19 reduces at the same rate as the brake pipe pressure reduces in effecting a service application of the brakes. Consequently, the fluid pressure on opposite sides of piston 18, reducing at substantially the same rate, the spring 49 prevents movement of the piston 18 to emergency position.

When a sudden reduction in brake pipe pressure occurs either by movement of the brake valve device to emergency position or otherwise, the pressure in piston chamber 17 is reduced at a greater rate than fluid can be vented from the valve chamber 19 and quick action reservoir 22, by flow through the restricted port 47, and consequently piston 18 is shifted to emergency position.

The emergency valve is moved by the piston stem 25 and connects passages 35 and 51 through cavity 52 in the emergency valve 23, thus establishing communication between the emergency reservoir 5 and the brake cylinder 10 through pipe 29, passage 51, cavity 52, passage 35 and pipe 36. At this time the cavity 41 is moved out of registry with passage 39 and thus closes any communication between the brake cylinder and the volume reservoir 43.

The triple valve piston 8 is also moved to brake application position by the sudden reduction in brake pipe pressure and since the passage 39 leading to the volume reservoir is closed at this time by the emergency valve 23, and since fluid may then flow to the brake cylinder from the auxiliary reservoir, and the emergency reservoir, maximum pressure is supplied to the brake cylinder when an emergency application is made.

It will be understood that when the brake pipe pressure is restored to normal, both the triple and emergency valves will be returned in the well known manner to their normal release position illustrated, and that the brakes will be released and the volume reservoir exhausted to atmosphere in readiness for another service or emergency application of the brakes.

In order to prevent possible lifting of the slide valve 23 from its seat, means are provided for yieldingly retaining it in engagement therewith, comprising a rod 55 pivotally engaging the valve at one end and a threaded socket nut 56 at the other end. A spring 57 surrounding the rod and compressed between the socket nut and a disc 58, yieldingly presses the rod against the valve 23. A clearance opening 59 is provided in the stem 25 of the emergency piston to permit of movement of the valve 23 and rod 55 without interference.

While I have disclosed but one embodiment of the invention for obtaining more uniform brake pressures throughout the length of the train, it is obvious that many alterations, additions and omissions may be made in the apparatus without departing from the spirit of the invention.

Having now described my invention, what I claim as new and desire to secure by Letters Patent, is:

1. In a fluid pressure brake, the combination with a brake pipe, a supply reservoir, a brake cylinder and a brake controlling valve device operated upon a reduction in brake pipe pressure for supplying fluid under pressure from said reservoir to the brake cylinder, of a volume reservoir, and means operative upon a rate of reduction in brake pipe pressure exceeding a predetermined rate for supplying fluid under pressure from the supply reservoir to the volume reservoir as well as to the brake cylinder.

2. In a fluid pressure brake, the combination with a brake pipe, a supply reservoir, a brake cylinder and a brake controlling valve device operated upon a reduction in brake pipe pressure for supplying fluid under pressure from said reservoir to the brake cylinder, of a volume reservoir normally at atmospheric pressure, and means operative upon a rate of reduction in brake pipe pressure exceeding a predetermined rate for supplying fluid under pressure from the supply reservoir to the volume reservoir as well as to the brake cylinder.

3. In a fluid pressure brake, the combination with a brake pipe, an auxiliary reservoir, a brake cylinder and a triple valve device operated upon a reduction in brake pipe pressure for supplying fluid under pressure from said reservoir to the brake cylinder, of a volume reservoir, and means operative upon a rate of reduction in brake pipe pressure exceeding a predetermined rate for supplying fluid under pressure from the auxiliary reservoir to the volume reservoir as well as to the brake cylinder.

4. In a fluid pressure brake, the combination with a brake pipe, an auxiliary reservoir, a brake cylinder and a triple valve device operated upon a reduction in brake pipe pressure for supplying fluid under pressure from said reservoir to the brake cylinder, of a volume reservoir, and means operative upon a rate of reduction in brake pipe pressure exceeding a predetermined rate for supplying fluid under pressure from the auxiliary reservoir to the volume reservoir as well as to the brake cylinder, and an emergency valve device operated upon a sudden reduction in brake pipe pressure for effecting an emergency application of the brakes, said emergency valve device controlling connections through which said triple valve device supplies fluid under pressure to the volume reservoir.

5. The combination with a plurality of fluid actuated brake operating motors having separate pressure modifying means associated therewith, a fluid pressure supply reservoir for each motor charged with fluid from a common supply pipe having a pressure gradient from one end to the other and in which the fluid pressure under normal conditions varies in accordance with the pressure gradient in the supply pipe, of a valve means for each motor responsive to fluid pressure in the supply pipe and so subject to the pressure gradient therein that each valve means is supplied with a different actuating fluid pressure, said valve means having means to connect the supply reservoirs with their respective motors when the actuating pressure supplied to the valve means is a predetermined value and having means to render their respective pressure modifying means effective when the actuating pressure supplied to any one thereof is below that predetermined value.

6. In a braking system, a fluid actuated motor for the brakes, a volume reservoir associated therewith, a storage reservoir for normally supplying fluid under a predetermined pressure to the motor, and a valve responsive to reduction in pressure in the storage reservoir for controlling the supply of fluid from the storage reservoir to the motor and to the volume reservoir to reduce the effective pressure on the motor.

7. In a braking system a fluid actuated motor for the brakes, a volume reservoir associated therewith, a storage reservoir for normally supplying fluid under a predetermined pressure to the motor, a valve responsive to reduction in pressure in the storage reservoir for controlling the supply of fluid from the storage reservoir to the motor and to the volume reservoir, and a second pressure responsive valve for rendering the first valve ineffective to control the supply of fluid to the volume reservoir.

8. In a braking system, a plurality of fluid actuated motors for the brakes, a service reservoir and an emergency reservoir for each motor for supplying fluid under pressure thereto, a volume reservoir associated with each motor, a brake pipe for supplying fluid under pressure to the reservoirs, a service valve and an emergency valve for each motor for controlling the supply of fluid from the brake pipe to the said reservoirs and from the service and emergency reservoirs to the motor, the said valves being responsive to pressures in the brake pipe, means on the service valve for controlling the delivery of fluid from the service reservoir to the motor and to the volume reservoir, and means on the emergency valve for controlling the delivery of fluid from the emergency reservoir to the motor and for rendering the service valve ineffective to control the delivery of fluid to the volume reservoir when the emergency valve has been actuated in response to a predetermined reduction in pressure in the brake pipe.

In testimony whereof I have hereunto set my hand, this 20th day of October, 1931.

EARLE S. COOK.